United States Patent
Surana et al.

(10) Patent No.: US 11,162,400 B2
(45) Date of Patent: Nov. 2, 2021

(54) STAGGERED ARRAY ARRANGEMENT FOR AIR/LIQUID SEPARATION

(71) Applicant: CUMMINS FILTRATION IP, INC., Columbus, IN (US)

(72) Inventors: Navin Surana, Rajnandgaon (IN); Vijay Kolhe, Nashik (IN); Shantanu Sanjay Ghatnekar, Pune (IN)

(73) Assignee: Cummins Filtration IP, Inc., Columbus, IN (US)

( * ) Notice: Subject to any disclaimer, the term of this patent is extended or adjusted under 35 U.S.C. 154(b) by 0 days.

(21) Appl. No.: 17/268,499

(22) PCT Filed: Aug. 26, 2019

(86) PCT No.: PCT/US2019/048070
§ 371 (c)(1),
(2) Date: Feb. 15, 2021

(87) PCT Pub. No.: WO2020/046778
PCT Pub. Date: Mar. 5, 2020

(65) Prior Publication Data
US 2021/0246817 A1    Aug. 12, 2021

(30) Foreign Application Priority Data
Aug. 27, 2018 (IN) .............................. 201841031967

(51) Int. Cl.
*F02B 25/06* (2006.01)
*F01M 13/04* (2006.01)
(Continued)

(52) U.S. Cl.
CPC .............. *F01M 13/04* (2013.01); *B01D 45/08* (2013.01); *B01D 50/002* (2013.01); *F01M 2013/0433* (2013.01); *F02M 25/06* (2013.01)

(58) Field of Classification Search
CPC . F01M 13/04; F01M 2013/0433; B01D 45/08
(Continued)

(56) References Cited

U.S. PATENT DOCUMENTS

| 1,910,728 A | 5/1933 | Waters |
| 1,999,950 A | 4/1935 | Waters |

(Continued)

OTHER PUBLICATIONS

International Search Report and Written Opinion issued for PCT Application No. PCT/US2019/048070 dated Nov. 12, 2019, 9 pages.

*Primary Examiner* — Long T Tran
*Assistant Examiner* — James J Kim
(74) *Attorney, Agent, or Firm* — Foley & Lardner LLP

(57) ABSTRACT

A separator system comprises a main separator, and an additional separator including one of a pre-separator, post separator, or line-of-sight baffle. The additional separator separates liquid particles from an air/liquid mixture and comprises an inlet, an air outlet, a liquid outlet, and a plurality of posts disposed between the inlet and the air outlet. The posts are arranged in a staggered array and comprise a convex end portion having an impaction surface, a portion of liquid particles from the air/liquid mixture adhering as a liquid film to the impaction surface, and a hook end portion positioned downstream the convex end portion and including hooks having an end and a collection pocket disposed between the impaction surface and the end. The collection pocket collects the portion of liquid particles adhered as the liquid film to the impaction surface.

20 Claims, 13 Drawing Sheets

(51) Int. Cl.
  *B01D 45/08*   (2006.01)
  *F02M 25/06*   (2016.01)
  *B01D 50/00*   (2006.01)
(58) Field of Classification Search
  USPC .......................................................... 123/572
  See application file for complete search history.

(56) References Cited

U.S. PATENT DOCUMENTS

| | | | |
|---|---|---|---|
| RE25,061 | E | 10/1961 | Raub et al. |
| 3,849,095 | A | 11/1974 | Regehr |
| 4,292,050 | A | 9/1981 | Linhardt et al. |
| 4,545,792 | A | 10/1985 | Huettlin |
| 6,478,019 | B2 * | 11/2002 | Fedorowicz ....... F01M 13/0416 123/572 |
| 7,166,140 | B2 * | 1/2007 | Entezarian ............. B01D 45/08 55/320 |
| 8,663,370 | B2 | 3/2014 | Slaughter et al. |
| 2002/0189213 | A1 * | 12/2002 | Neuschwander ...... B01D 45/08 55/385.3 |
| 2007/0145611 | A1 | 6/2007 | Lee et al. |
| 2007/0295315 | A1 * | 12/2007 | Guerry ................... F01M 13/04 123/572 |
| 2010/0126479 | A1 * | 5/2010 | Shieh ..................... F01M 13/04 123/573 |
| 2014/0109533 | A1 * | 4/2014 | Horiuchi ........... B01D 46/0089 55/430 |
| 2014/0182568 | A1 * | 7/2014 | Hwang ................. F01M 13/04 123/572 |
| 2017/0089208 | A1 | 3/2017 | Kippel et al. |

\* cited by examiner

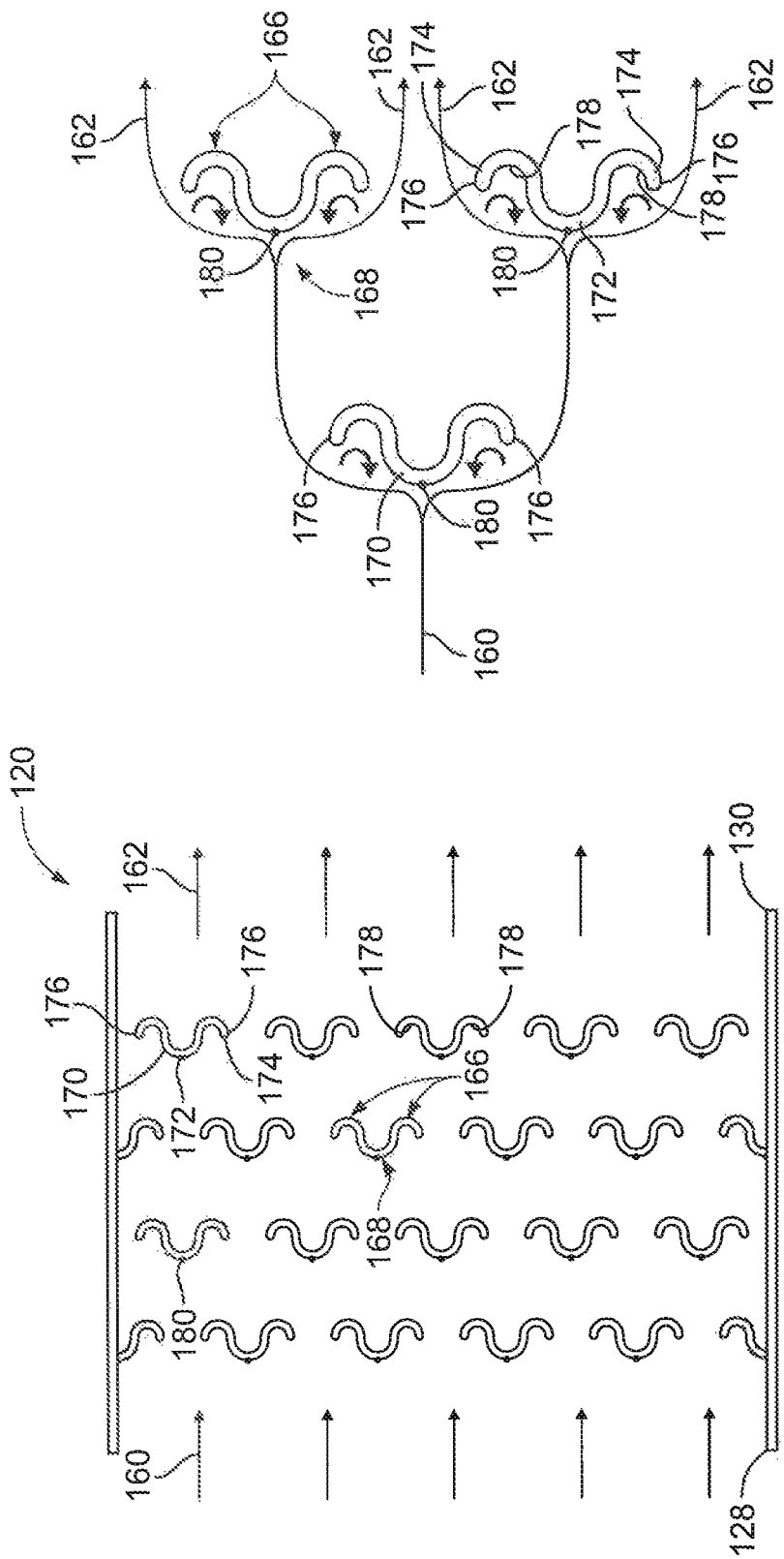

STAGGERED ARRAY ARRANGEMENT FOR AIR/LIQUID SEPARATION

CROSS-REFERENCE TO RELATED APPLICATIONS

This application is a national phase of PCT Application No. PCT/US2019/048070, filed Aug. 26, 2019, which claims priority to Indian Provisional Application No. 201841031967, filed Aug. 27, 2018. The contents of these applications are hereby incorporated by reference in their entirety.

TECHNICAL FIELD

The present disclosure relates generally to air/liquid separators for use with internal combustion engine systems or like.

BACKGROUND

Internal combustion engines generate blowby gas in a crankcase, with the blowby gas containing engine oil and oil aerosol. An air/oil separator has an inlet receiving blowby gas (oil aerosol) from the crankcase, an air outlet discharging clean blowby gas to the atmosphere or back to the engine air intake, and an oil outlet discharging scavenged separated oil back to the crankcase. Oil pre-separation may help reduce the load on the air/oil separator by removing coarser oil particles from the air.

SUMMARY

Various example embodiments relate to a separator system. The separator system comprises an optional pre-separator configured to separate liquid particles from an air/liquid mixture, and a main separator. The pre-separator comprises a pre-separator inlet receiving the air/liquid mixture from the crankcase, a pre-separator air outlet discharging a pre-separated air/liquid mixture, a pre-separator liquid outlet discharging separated liquid, and multiple posts disposed between the pre-separator inlet and the pre-separator air outlet. The posts are arranged in a staggered array and each comprises a convex end portion having an impaction surface contacting the air/liquid mixture, a portion of liquid particles from the air/liquid mixture adhering as a liquid film to the impaction surface, and a hook end portion positioned downstream the convex end portion and including one or more hooks having an end and a collection pocket disposed between the impaction surface and the end, the collection pocket configured to collect the portion of liquid particles adhered as a liquid film to the impaction surface. The main separator comprises an inlet receiving the pre-separated air/liquid mixture from the pre-separator, a main separator air outlet discharging a clean air/liquid mixture, and a main separator liquid outlet discharging separated liquid.

Other example embodiments relate to an air/liquid pre-separator. The air/liquid pre-separator is configured to separate liquid particles from an air/liquid mixture. The pre-separator comprises a pre-separator inlet receiving the air/liquid mixture, a pre-separator air outlet discharging a pre-separated air/liquid mixture, a pre-separator liquid outlet discharging separated liquid, and multiple posts disposed between the pre-separator inlet and the pre-separator air outlet. The posts are arranged in a staggered array and each comprises a convex end portion having an impaction surface contacting the air/liquid mixture, a portion of liquid particles from the air/liquid mixture adhering to the impaction surface, and a hook end portion positioned downstream the convex end portion and including one or more hooks having an end and a collection pocket disposed between the impaction surface and the end, the collection pocket configured to collect the portion of liquid particles adhered to the impaction surface.

These and other features, together with the organization and manner of operation thereof, will become apparent from the following detailed description when taken in conjunction with the accompanying drawings, wherein like elements have like numerals throughout the several drawings described below.

BRIEF DESCRIPTION OF THE FIGURES

FIG. 2 shows a section view of a pre-separator for use with the crankcase ventilation system of FIG. 1A, according to an example embodiment.

FIG. 3 shows a portion of a section view of the pre-separator of FIG. 2, according to an example embodiment.

DETAILED DESCRIPTION

Figure 1A:
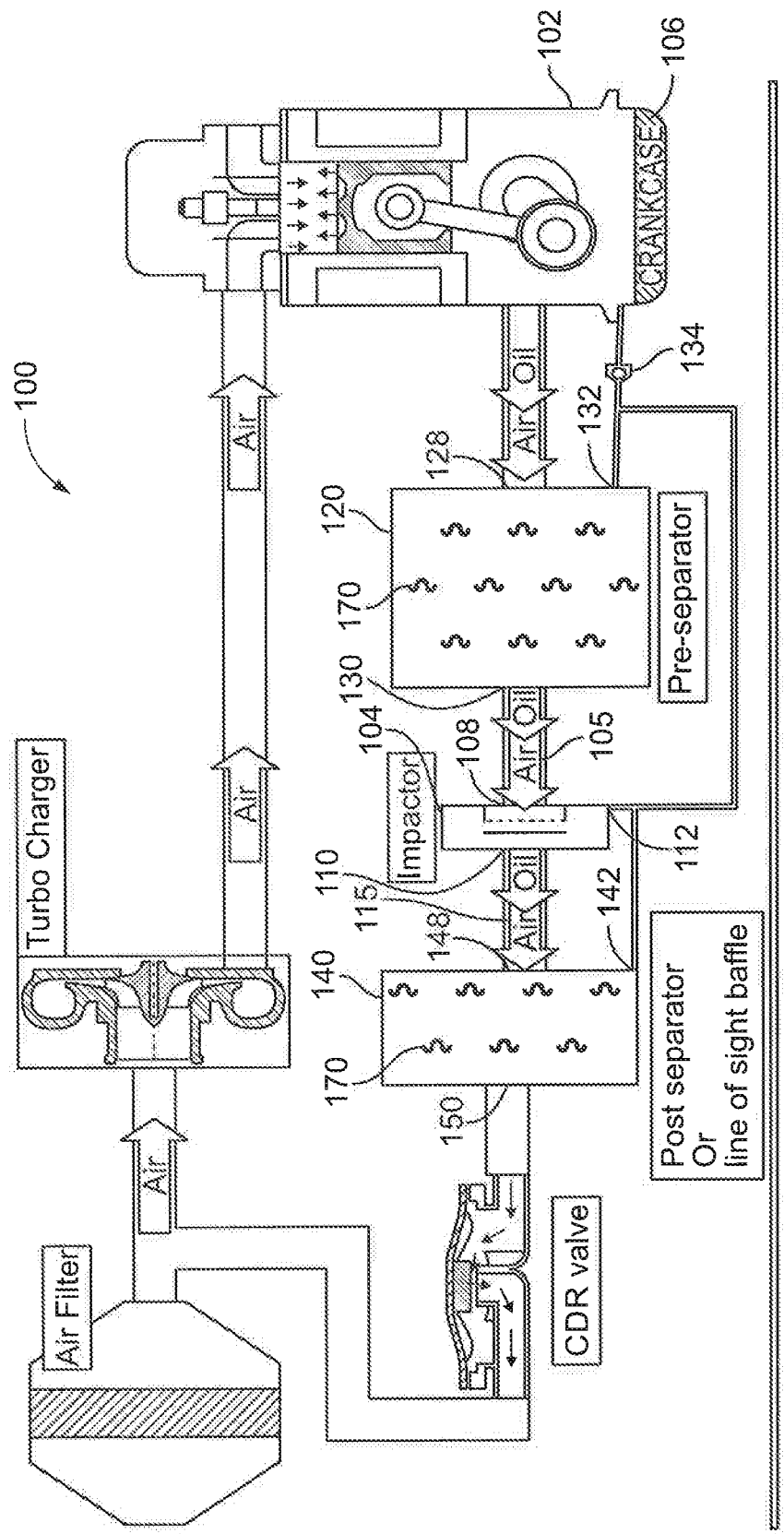
FIG. 1A shows a schematic view of a crankcase ventilation system, according to an example embodiment.
Figure 1B:
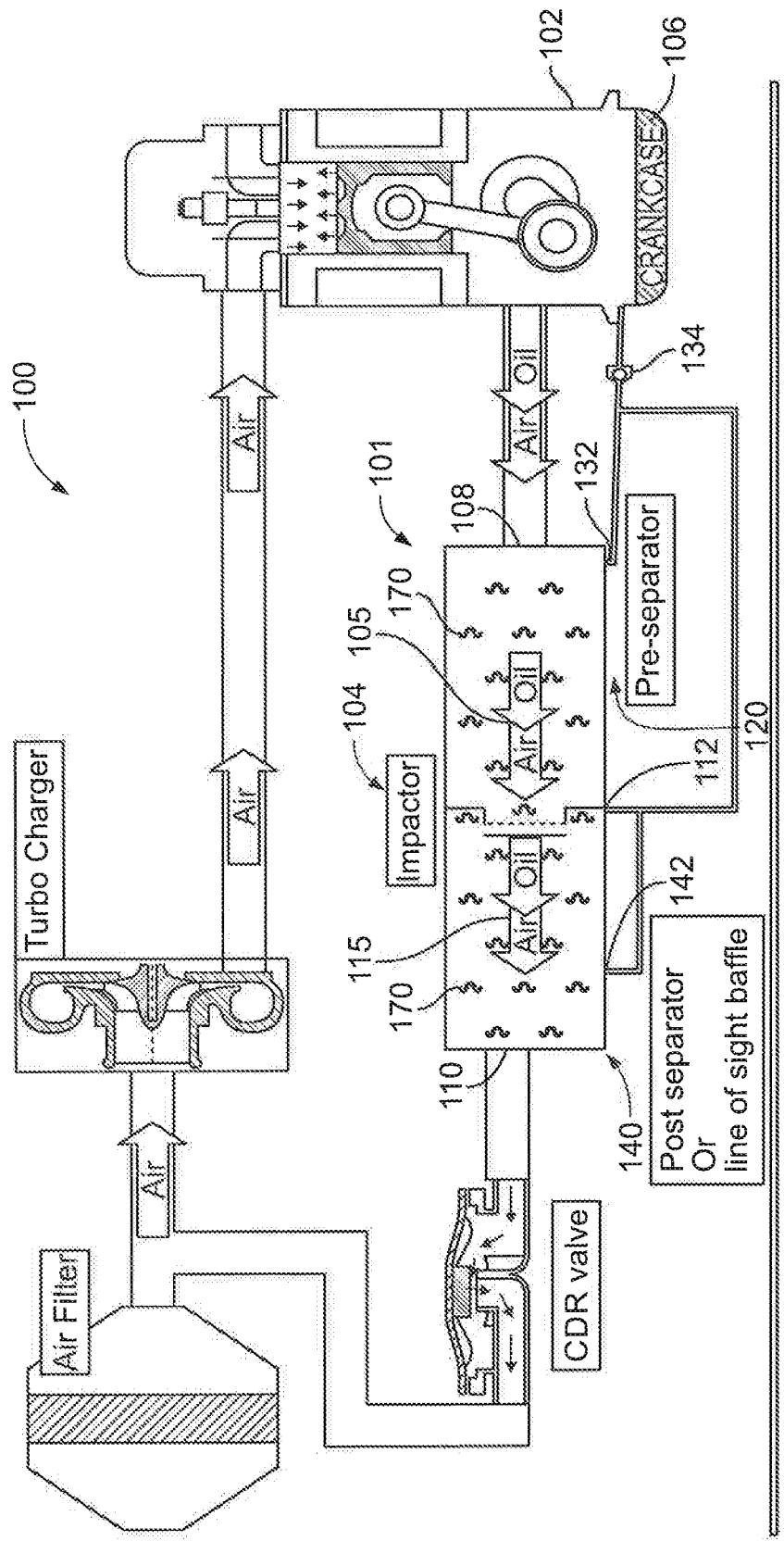
FIG. 1B shows a schematic view of a crankcase ventilation system, according to another example embodiment.
Figure 1C:
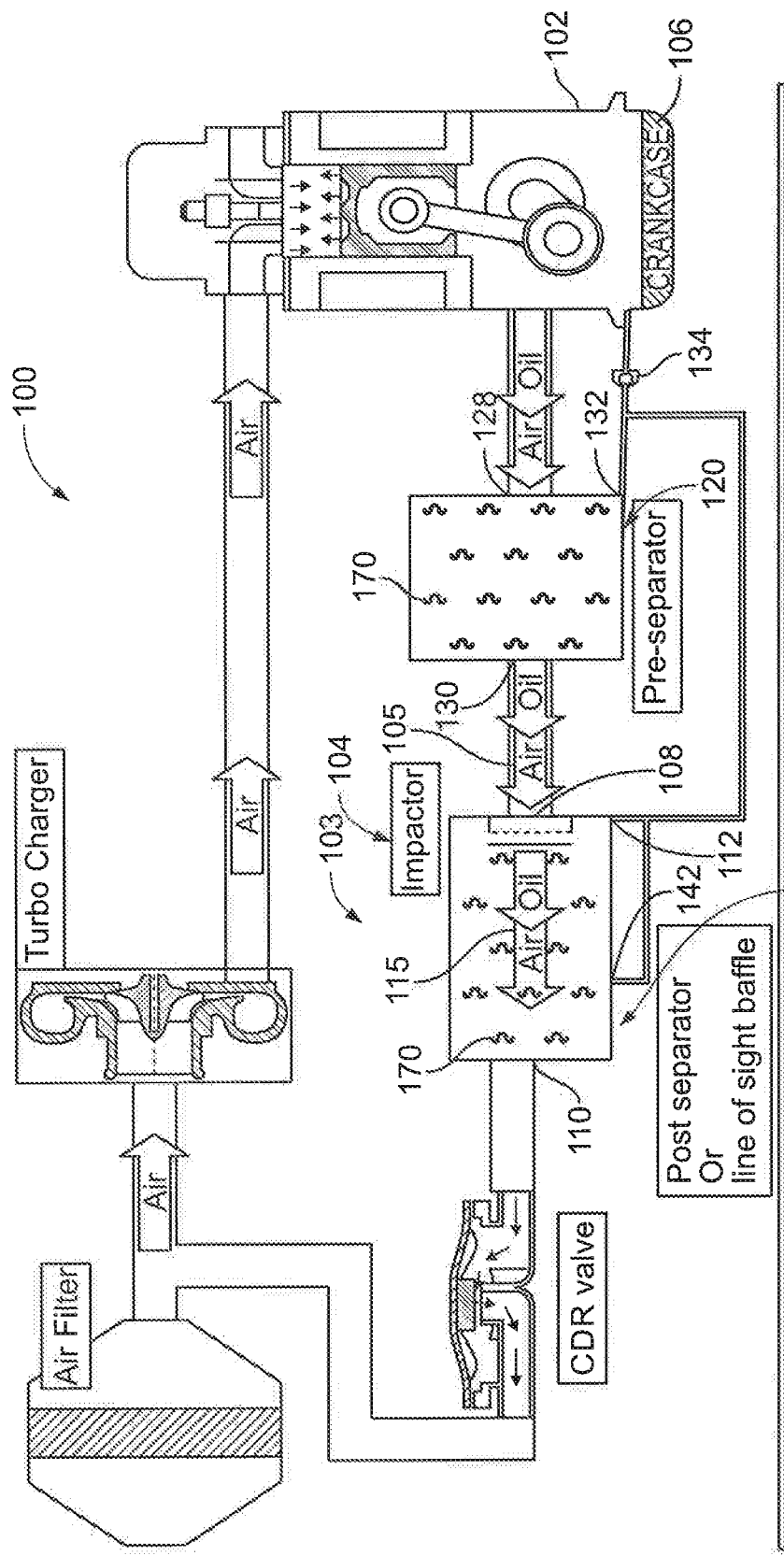
FIG. 1C shows a schematic view of a crankcase ventilation system, according to another example embodiment.

Referring to the figures generally, an air/liquid separator is shown. The air/liquid separator can be used as a standalone unit or with any system as a pre-separator, post-separator, or line-of-sight baffle. Although shown in use with a crankcase ventilation system herein, this is for example purposes only. The air/liquid separator can be used with various systems to separate a liquid from an air/liquid mixture. Referring to some example uses for the air/liquid separator, FIGS. 1A-1C show a crankcase ventilation system. When used with a crankcase ventilation system, the separator described herein is used as an air/oil separator and can be implemented as a pre-separator, post-separator, or line-of-sight baffle. The crankcase ventilation system is used for cleaning blowby gas generated by an internal combustion engine, discharging the clean blowby gas to atmosphere or to an engine air intake, and recirculating the separated oil back to the crankcase. The crankcase ventilation system described herein can be used with a pre-air/oil separator to aid in the effective separation of oil from an air/oil mixture flowing therethrough. In some instances, the main separator (e.g., standard impactors, variable impactors, stationary coalescers, rotating coalescers) may experience significant load, which reduces the efficiency of the main separator. Additionally, in some cases, oil carryover or oil re-entrainment may occur due to the load on the main separation device. Moreover, the pressure differential between the crankcase and the oil outlet of the separator due to the load on the main separator can cause backflow of oil from the crankcase to the oil outlet. By using a pre-air/oil separator, the filtering, drainage, and recirculation of oil in the system can be improved. In this way, the service intervals of the system can also be extended.

The pre-separator described herein fits into a limited space on an engine and is relatively more effective at managing the flow velocity as compared with conventional baffle-type separators, which block a large portion of flow area, thereby increasing the flow velocity and the likelihood of re-entrainment of separated liquid (e.g., oil) particles. The pre-separator described herein does not comprise a complete solid cylindrical post, and consequently uses less material, making the separator lighter in weight and less expensive. In addition, the staggered array arrangement of the posts in the pre-separator, along with the inclusion of hooks, effectively separates and drains the separated liquid and reduces the flow velocity by distributing the flow, which reduces the likelihood of re-entrainment and liquid or oil carryover. The staggered array of posts described herein can also be used as a line-of-sight baffle after the main separator in place of a conventional baffle, helping to avoid direct escape of liquid particles to the outlet and to distribute the flow of fluid therethrough. As described above, although shown in use with a crankcase ventilation system, the air/liquid separator can be used with various other types of systems to separate a liquid from an air/liquid mixture.

Referring to FIG. 1A, a crankcase ventilation system 100 for an internal combustion engine generating blowby gas in a crankcase 102 containing engine oil 106 and oil aerosol is shown according to an example embodiment. The system 100 includes a pre-separator 120 having a pre-separator inlet 128 receiving blowby gas and oil aerosol from the crankcase 102, a pre-separator air outlet 130 discharging pre-cleaned blowby gas and oil aerosol, and a pre-separator oil outlet 132 discharging separated oil back to the crankcase 102. In some embodiments, a check valve 134 is positioned between the pre-separator oil outlet 132 and the crankcase 102 to prevent back flow of the drained oil and/or dirty blowby gases from the crankcase 102 to the pre-separator 120. The pre-cleaned blowby gas exiting the pre-separator air outlet 130 includes an air/oil mixture, which is directed to the main separator 104 for further filtering (as denoted by arrow 105). The pre-separator 120 provides a pre-separation of coarser oil particles from the blowby gas and oil aerosol exiting the crankcase 102 prior to entry into the main separator 104.

The main separator 104 (e.g., shown as an impactor in FIG. 1A) includes a main separator inlet 108 receiving pre-cleaned blowby gas (including an air/oil mixture) from the pre-separator 120, a main separator air outlet 110 discharging clean blowby gas, and a main separator oil outlet 112 discharging separated oil back to the crankcase 102. In some embodiments, and as shown in FIG. 1A, a post-separator 140 or line-of-sight baffle may also be included within the system 100. The post-separator 140 includes a post-separator inlet 148 receiving cleaned blowby gas (e.g., including an air/oil mixture) from the main separator 104 (as denoted by arrow 115), a post-separator air outlet 150 discharging cleaned blowby gas returned to the engine air intake, and a post-separator oil outlet 142 discharging separated liquid (e.g., oil) back to the crankcase 102. The post-separator 140 provides a third filter for the blowby gas from the crankcase 102 prior to being routed back to the engine air intake.

Referring to FIG. 1B, in another embodiment, the pre-separator 120, the main separator 104, and post-separator 140 are incorporated into a single unit 101 with a single inlet 108 and a single air outlet 110. The inlet 108 of the single unit 101 receives blowby gas and oil aerosol from the crankcase 102. The blowby gas and oil aerosol flows through the pre-separator portion 120 of the single unit 101 and toward the main separator portion 104 (e.g., shown as an impactor in FIG. 1B) as denoted by arrow 105. The pre-cleaned blowby gas flows through the main separator portion 104 and toward the post-separator portion 140 as denoted by arrow 115. The cleaned blowby gas is discharged from the single unit 101 through the air outlet 110. The single unit 101 also includes a pre-separator oil outlet 132, a main separator oil outlet 112, and a post separator oil outlet 142 discharging separated oil back to the crankcase 102.

Referring to FIG. 1C, in another embodiment, the post-separator 140 and the main separator 104 are incorporated into a unit 103, with the pre-separator 120 separator from the unit 103. The unit 103 includes an inlet 108 and an air outlet 110. The pre-separator 120 includes a pre-separator inlet 128 receiving blowby gas and oil aerosol from the crankcase 102, a pre-separator air outlet 130 discharging pre-cleaned blowby gas and oil aerosol, and a pre-separator oil outlet 132 discharging separated oil back to the crankcase 102. The pre-cleaned blowby gas exiting the pre-separator air outlet 130 includes an air/oil mixture, which is directed to the unit 103 for further filtering (as denoted by arrow 105). The pre-separator 120 provides a pre-separation of coarser oil particles from the blowby gas and oil aerosol exiting the crankcase 102 prior to entry into the main separator portion 104 of the unit 103. The inlet 108 of the unit 103 receives pre-cleaned blowby gas from the pre-separator 120. The pre-cleaned blowby gas flows through the main separator portion 104 of the unit 103 and toward the post-separator portion 140 as denoted by arrow 115. The cleaned blowby gas is discharged from the unit 103 through the air outlet 110. The unit 103 also includes a main separator oil outlet 112 and a post separator oil outlet 142 discharging separated oil back to the crankcase 102.

Referring to FIG. 2, a pre-separator 120 is shown according to an example embodiment. As discussed above, the pre-separator 120 includes a pre-separator inlet 128 receiving incoming fluid 160 (e.g., blowby gas and oil aerosol from the crankcase 102), and a pre-separator air outlet 130 discharging pre-separated fluid 162 (e.g., pre-cleaned blowby gas and oil aerosol). The pre-separator 120 includes a staggered array of oil separating posts 170 coupled to the body of the pre-separator 120 and positioned in the flow path of the incoming fluid 160. Each of the posts 170 includes a hook end portion 166 and a convex end portion 168. The hook end portion 166 includes one or more hooks 174. The convex end portion 168 includes a convex surface having a vertex 180 defined as the point on the impaction surface 172 furthest away from the hook end portion 166. The impaction surface 172 slopes toward the hooks 174 on each side of the vertex 180. The hooks 174 include ends 176 which extend back toward the impaction surface 172 and collection pockets 178 positioned between the ends 176 and the impaction surface 172.

Referring to FIGS. 2 and 3, the posts 170 are arranged in the pre-separator 120 with the convex end portion 168 nearer the pre-separator inlet 128 and the hook end portion 166 nearer the pre-separator air outlet 130 such that the hook end portion is positioned downstream of the convex end portion 168. The posts 170 are arranged such that the incoming fluid 160 contacts or impinges the impaction surface 172 of each post 170 approximately perpendicularly to the impaction surface 172 at the vertex 180 (e.g., approximately perpendicular to the tangent of impaction surface 172 at vertex 180). A portion of the particles of the incoming fluid 160 (e.g., larger oil particles) adhere to the impaction surface 172 as a film (e.g., oil film). The separated particles move downstream on the impaction surface 172 and collect in the collection pocket 178 of the hooks 174. The separated particles ultimately drain downward due to gravity and the low velocity of the fluid moving through the pre-separator 120.

The remaining portion of the incoming fluid 160 (e.g., portion not adhered to the impaction surface 172 or collected within collection pocket 178) moves through the pre-separator 120 toward pre-separator outlet 130 and contacts multiple rows of posts 170 prior to being discharged as pre-separated fluid 162 from the pre-separator 120. Accordingly, each time the incoming fluid 160 contacts a subsequent row of posts 170, at least a portion of particles of the incoming fluid 160 adheres to the impaction surfaces 172, is collected on the collection pockets 178, and drained from the pre-separator 120 back to the crankcase 102. As the incoming fluid 160 flows through the posts 170, the fluid is well distributed and is divided among the flow channels between the posts 170, thereby resulting in low flow velocity and less chance of re-entrainment of the separated liquid (e.g., oil, water) particles.

The pre-separator 120 shown in FIGS. 2-3 can also be used as a post-separator or line-of-sight baffle (e.g., post-separator 140) as shown in FIGS. 1A-1C. In the case of a post-separator 140, as discussed above, the post-separator 140 provides a third filter for the air/liquid mixture received from the main separator 104, where liquid (e.g., oil, water) particles that may have been regenerated or re-entrained in the fluid flow are separated prior routing the air flow back to the engine air intake. In the case of a line-of-sight baffle, a cleaned air/liquid mixture is received from the main separator 104 and the line-of-sight baffle breaks the direct flow path of the liquid (e.g., oil, water) particles after filtering by the main separator 104 and prior to routing the air flow back to the engine air intake.

Referring to FIGS. 4A-4G, various embodiments of the posts 170 are shown.

Figure 4A:
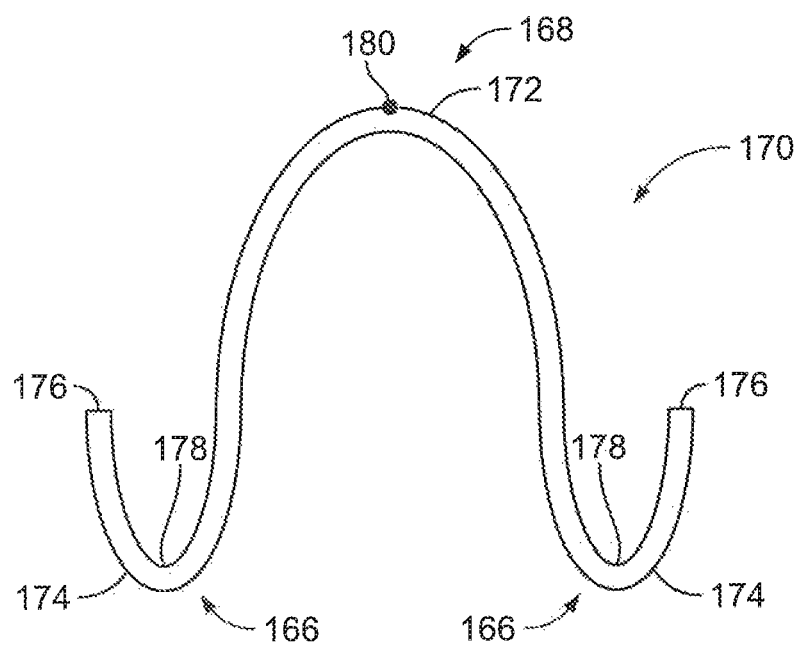
FIGS. 4A-4G show various schematic views of a post of the pre-separator of FIG. 2, according to example embodiments.
Figure 4B:
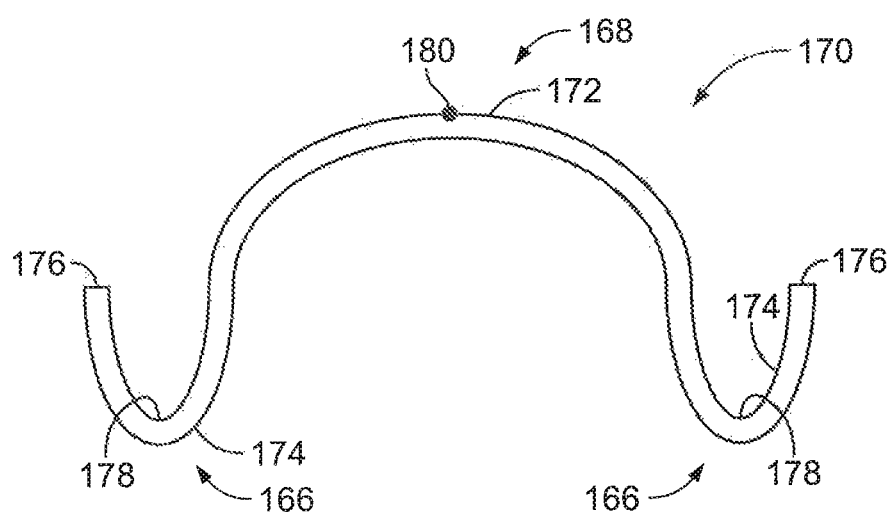
Figure 4C:
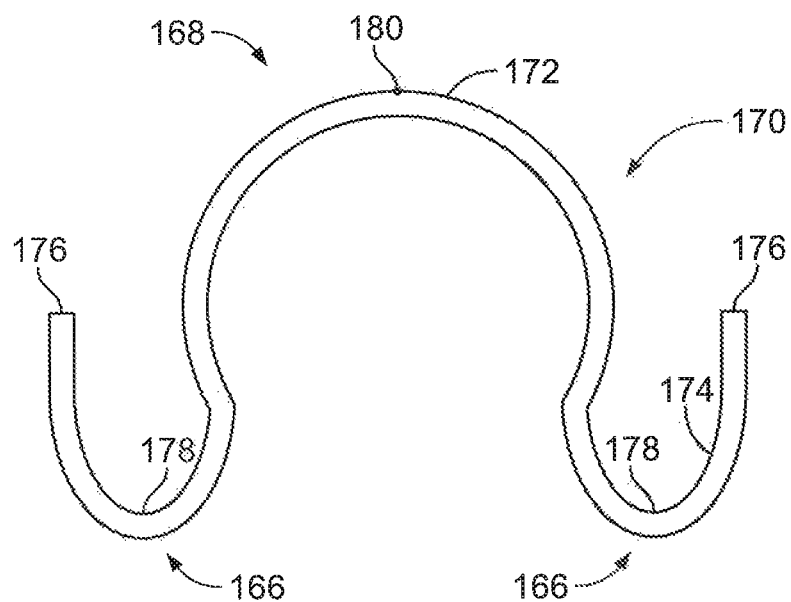
Figure 4D:
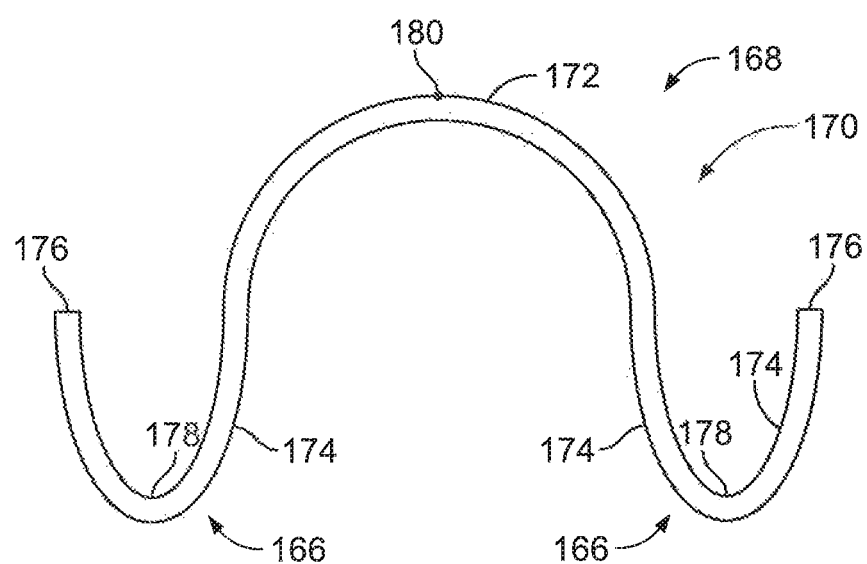
Figure 4E:
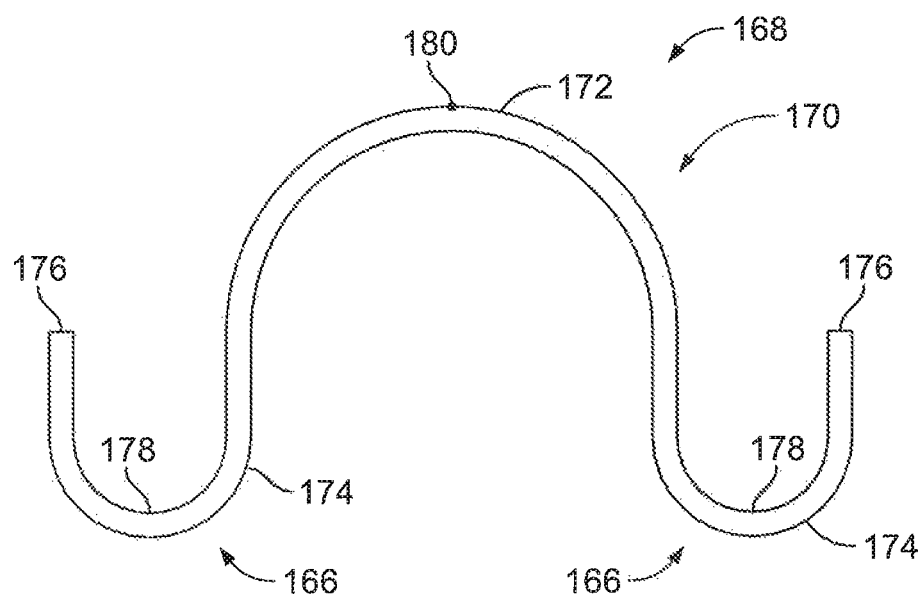
Figure 4F:
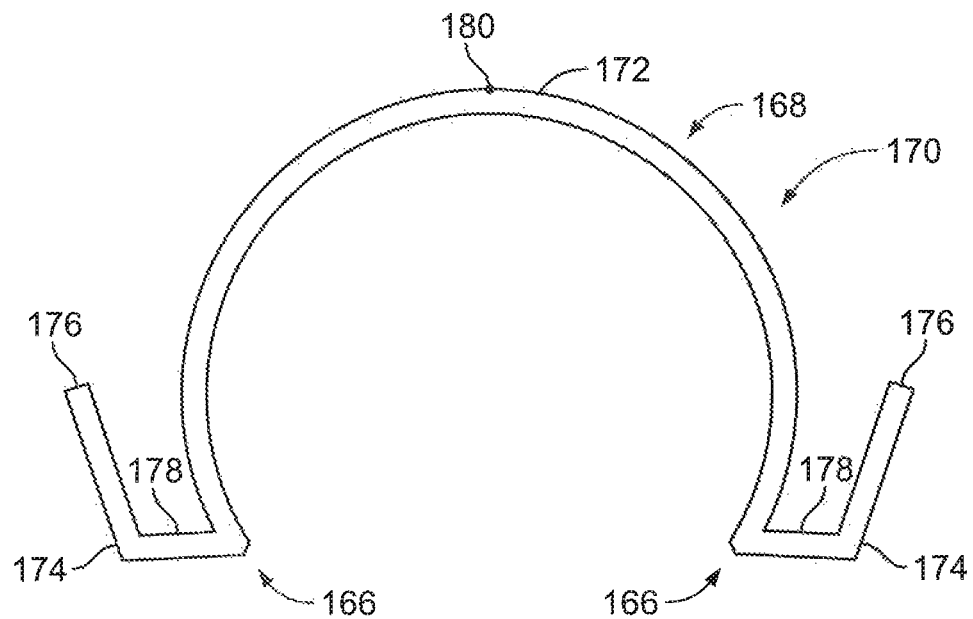
Figure 4G:
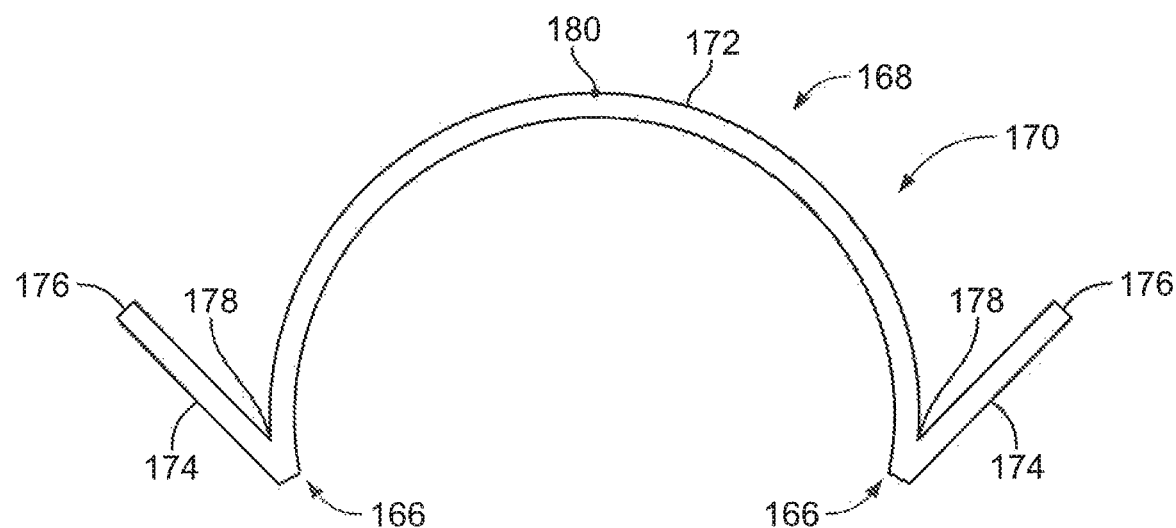

Referring to FIG. 4A, a post 170 with an elongated impaction surface is shown. Referring to FIG. 4B, a post 170 with a flattened impaction surface is shown. Referring to FIGS. 4C-4E, posts 170 with relatively larger hooks 174 are shown. Referring to FIG. 4F, a post 170 with a rectangular hook end portion 166 is shown. The surface of the collection pocket 178 on the rectangular hook end portion 166 is relatively flatter than the surface of the collection pockets 178 on the posts 170 shown in FIGS. 4A-4E. Referring to FIG. 4G, a post 170 with a triangular hook end portion 166 is shown. The collection pocket 178 on the triangular hook end portion 166 is relatively more pointed in shape than the posts 170 shown in FIGS. 4A-4F.

Figure 5:
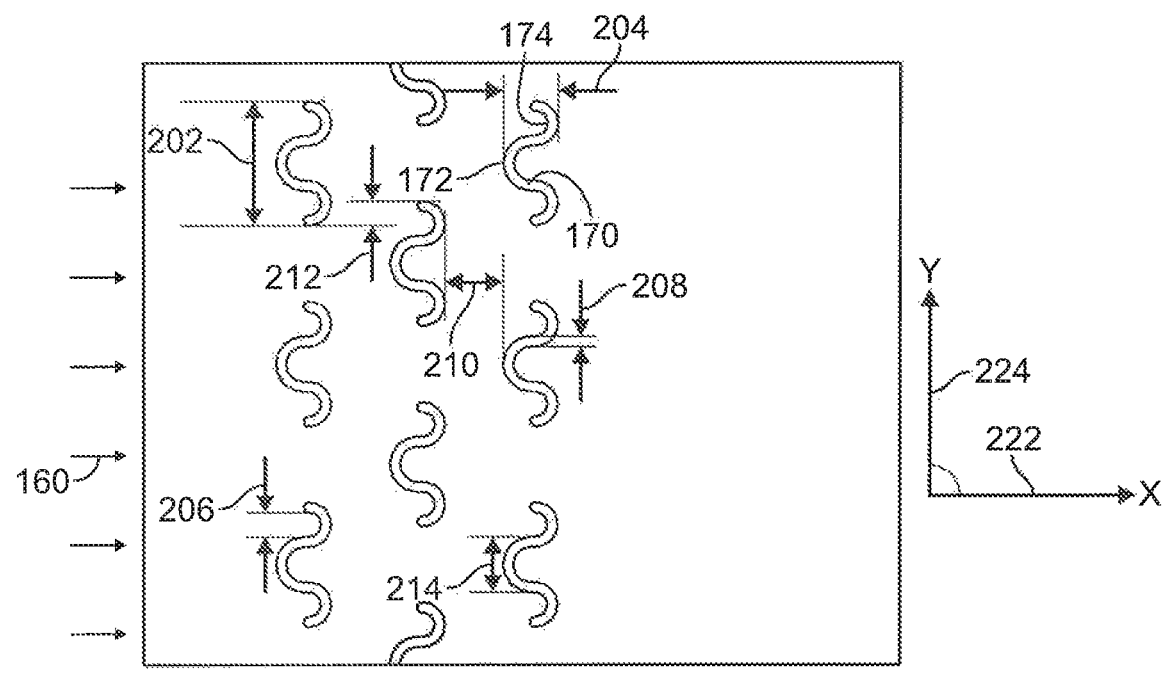
FIG. 5 shows a sectional view of the pre-separator of FIG. 2.
Figure 7:
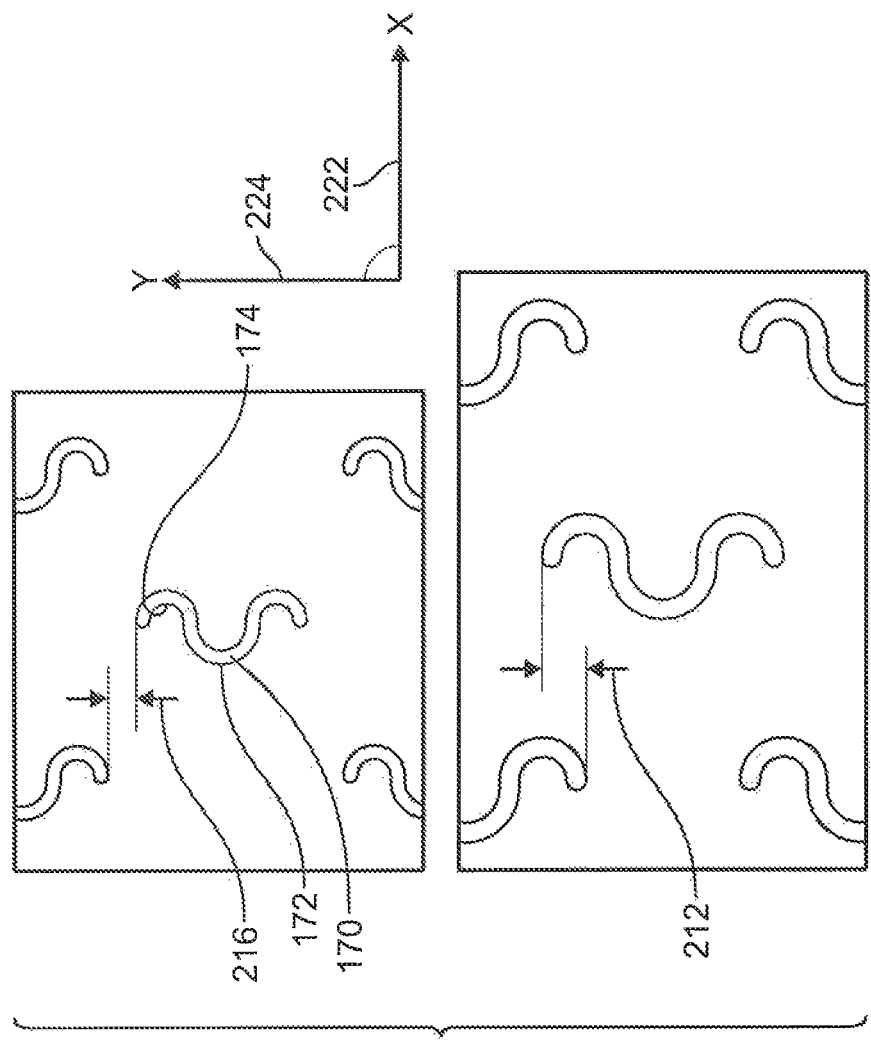
FIG. 7 shows sectional views of portions the pre-separator of FIG. 2, according to an example embodiment.
Figure 6:
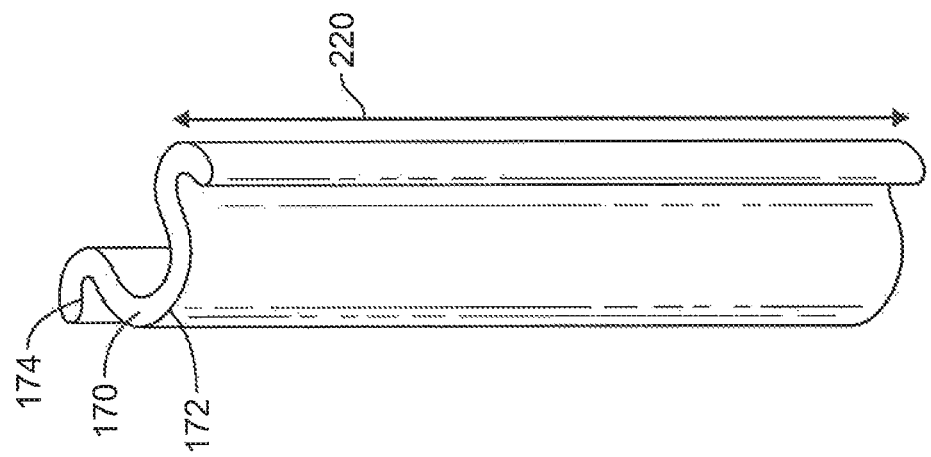
FIG. 6 shows a perspective view of a post of the pre-separator of FIG. 2, according to an example embodiment.

Referring to FIGS. 5-7, various characteristics of the posts 170 are shown. As shown in FIG. 5, the posts 170 have a post width 202, a post length 204, a hook inner diameter 206, a thickness 208, and a post outer diameter 214. In some embodiments, the hook inner diameter 206 ranges from 1 millimeter (mm) to 2.5 mm. In some embodiments, the post outer diameter 214 ranges from 3 mm to 5 mm. Accordingly, in some embodiments, the relative hook size, as defined by hook inner diameter 206 divided by post outer diameter 214, ranges from 0.2 to 0.5. In some embodiments, the thickness 208 ranges from 1 mm to 2.5 mm and is variable along the height of the post 170.

In addition, the posts 170 are arranged such that there is lateral spacing 210 between the posts 170 in an x-direction 222 (e.g., along the flow direction of the incoming fluid 160) and a positive overlap 212 between the posts 170 in a y-direction 224 (e.g., perpendicular to the flow direction of the incoming fluid 160). In some embodiments, the spacing factor, which is defined by the lateral spacing 210 divided by the post length 204, ranges from 0.8 to 1.2. In some embodiments, the overlap factor, which is defined by the overlap 212 divided by the post width 202, ranges from −0.2 to 0.25. As shown in FIG. 6, the posts 170 also have a post height 220. In some embodiments, the post height 220 can range up to 85 mm. As shown in FIG. 7, in some embodiments, the posts 170 may be arranged such that there is a negative overlap 216 between the posts 170 in a y-direction 224 such that there is spacing between the posts 170.

Figure 8:
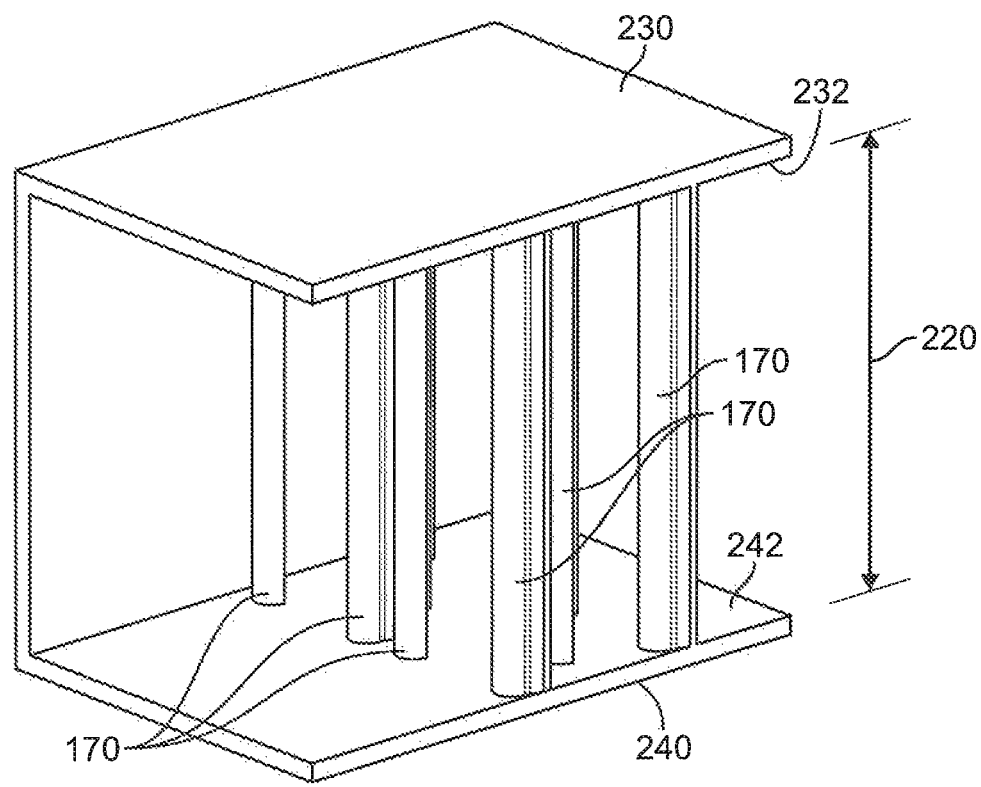
FIG. 8 shows a perspective view of a post arrangement of the pre-separator of FIG. 2, according to an example embodiment.
Figure 9:
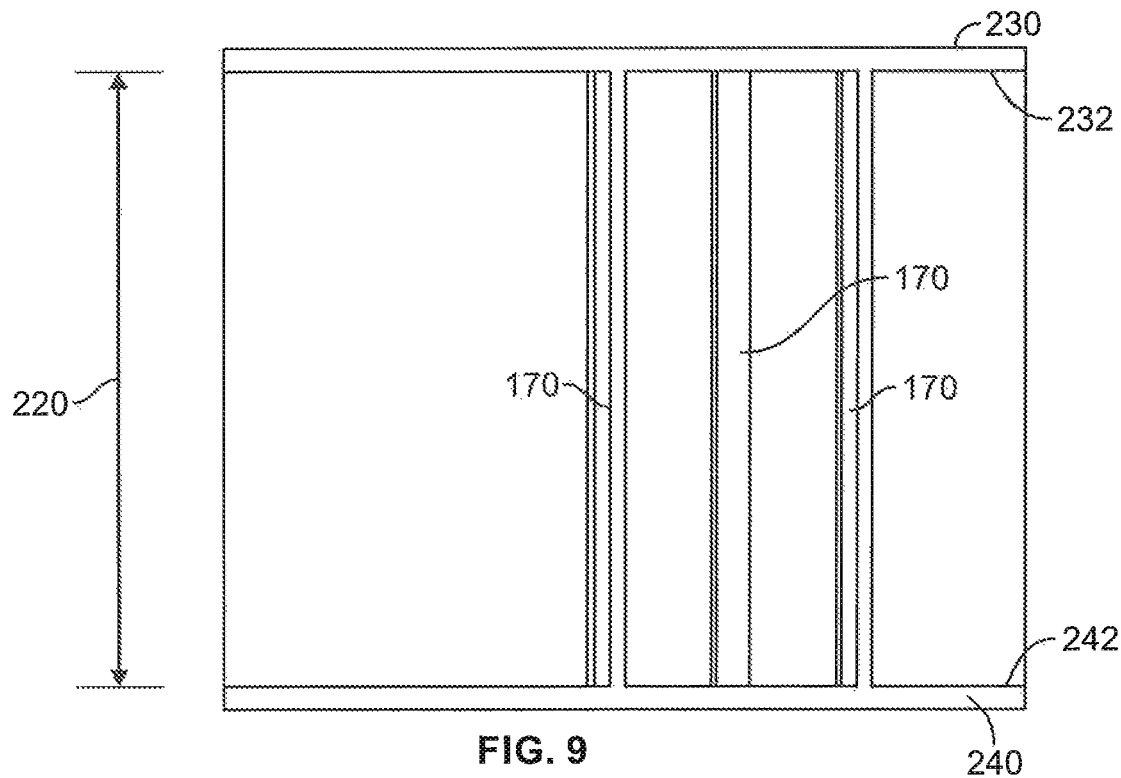
FIG. 9 shows a front view of the post arrangement of FIG. 8.

Referring to FIGS. 8-14, various post arrangements are shown. Referring to FIGS. 8-9, a first post arrangement is shown, according to an example embodiment. The first post arrangement is shown in use with a pre-separator 120, but can also be used as part of a post-separator 140. The pre-separator 120 includes a top wall 230 having a top wall interior surface 232 and a bottom wall 240 including a bottom wall interior surface 242. As shown in FIGS. 8-9, the posts 170 extend between the top wall interior surface 232 and the bottom wall interior surface 242. The post height 220 is defined as the height between the top wall interior surface 232 and the bottom wall interior surface 242. In this embodiment, no gap exists between the end of the posts 170 and either the top wall interior surface 232 or the bottom wall interior surface 242.

Figure 10:
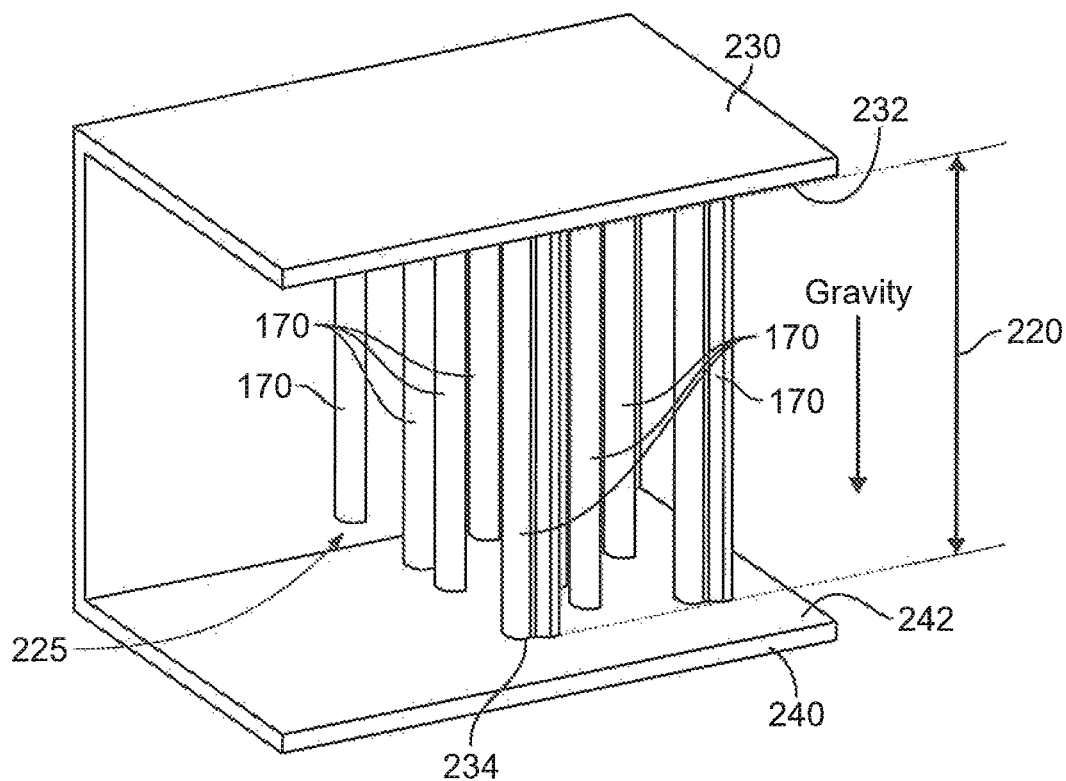
FIG. 10 shows a perspective view of a post arrangement of the pre-separator of FIG. 2, according to another example embodiment.
Figure 11:
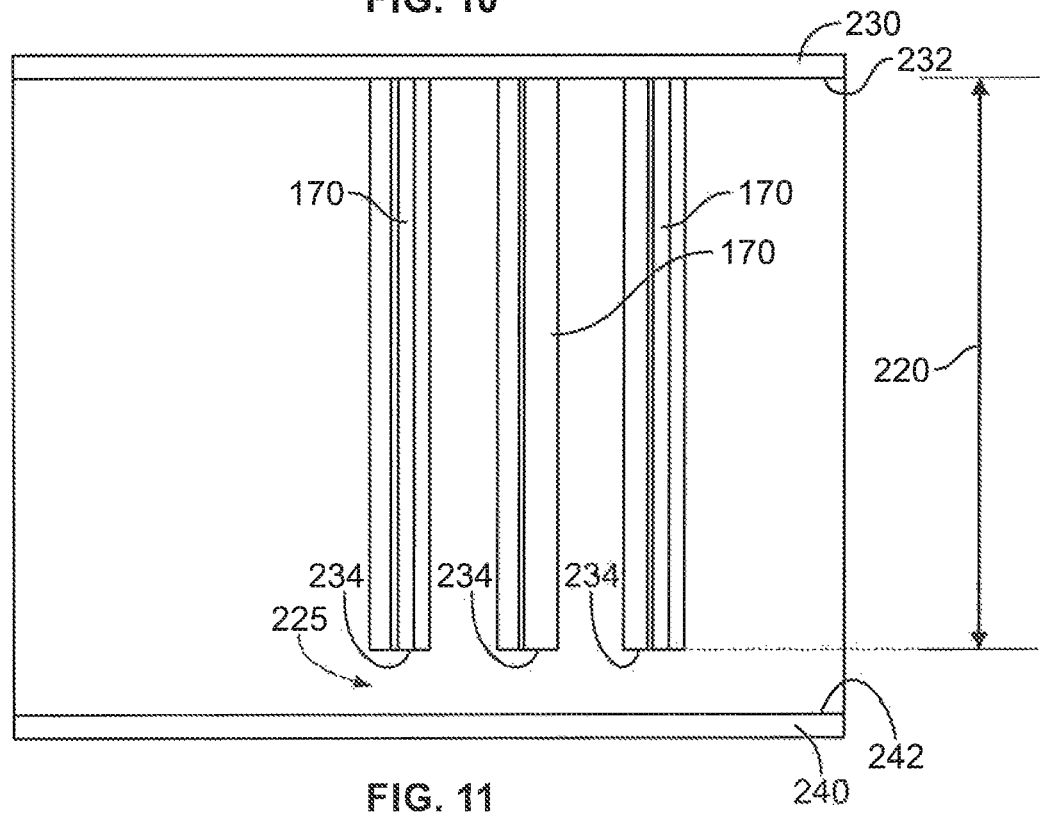
FIG. 11 shows a front view of the post arrangement FIG. 10.

Referring to FIGS. 10-11, a second post arrangement is shown, according to another example embodiment. The second post arrangement is shown in use with a pre-separator 120, but can also be used as part of a post-separator 140. The pre-separator 120 includes a top wall 230 having a top wall interior surface 232 and a bottom wall 240 including a bottom wall interior surface 242. The posts 170 each extend from the top wall interior surface 232 to a bottom end face 234 proximate, but not contacting, the bottom wall interior surface 242. The bottom end face 234 is spaced a distance from the bottom wall interior surface 242. Accordingly, a gap 225 exists between the bottom end faces 234 of the posts 170 and the bottom wall interior surface 242. The top wall interior surface 232 is above the bottom wall interior surface 242 relative to the direction of gravity. The posts 170 each include a post height 220 defined as the height between the top wall interior surface 232 and the bottom end face 234 of the post 170.

Figure 12:
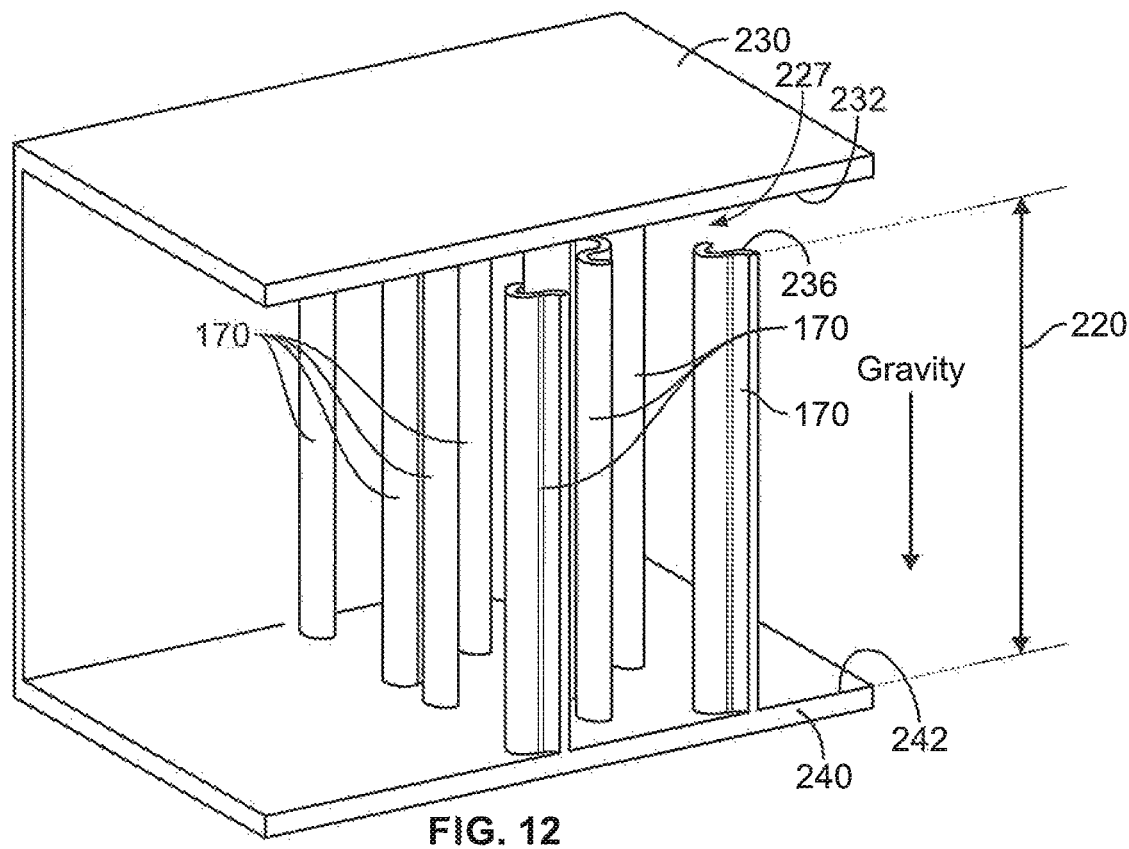
FIG. 12 shows a perspective view of a post arrangement of the pre-separator of FIG. 2, according to yet another example embodiment.
Figure 13:
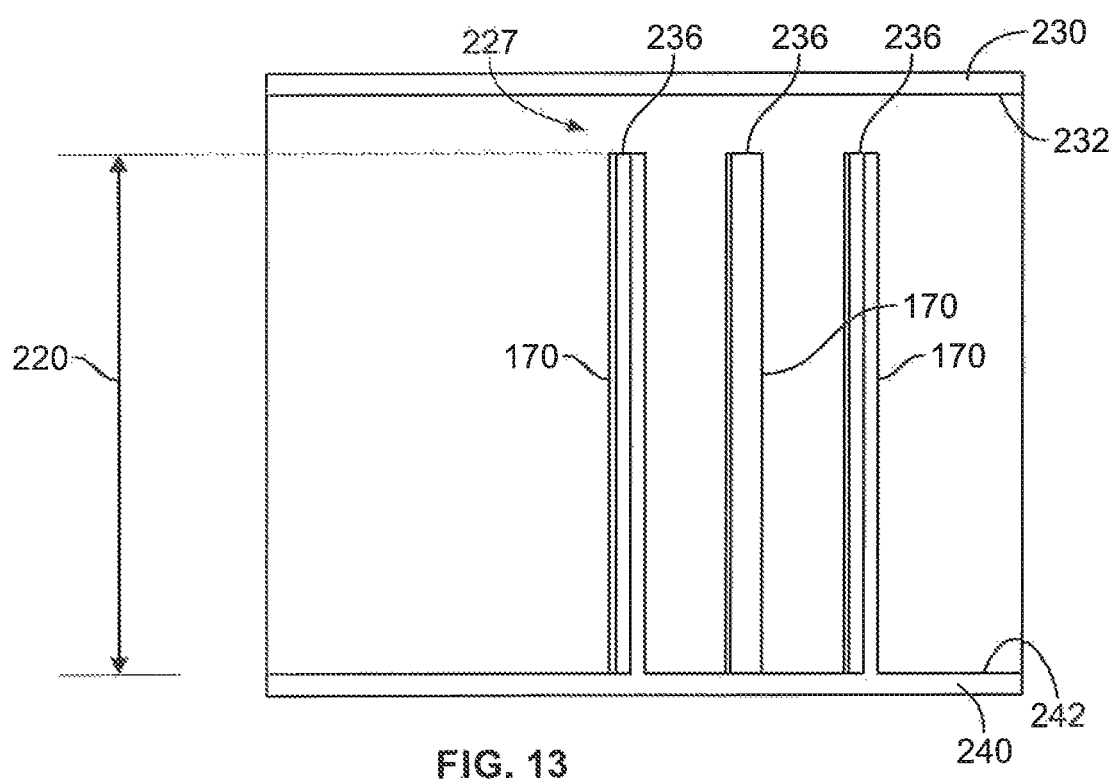
FIG. 13 shows a front view of a post arrangement of FIG. 12.

Referring to FIGS. 12-13, a third post arrangement is shown, according to still another example embodiment. The third post arrangement is shown in use with a pre-separator 120, but can also be used as part of a post-separator 140. The pre-separator 120 includes a top wall 230 having a top wall interior surface 232 and a bottom wall 240 including a bottom wall interior surface 242. The posts 170 each extend from the bottom wall interior surface 242 to a top end face 236 proximate, but not contacting the top wall interior surface 232. The top end face 236 is spaced a distance from the top wall interior surface 232. Accordingly, a gap 227 exists between the top end faces 236 of the posts 170 and the top wall interior surface 232. The top wall interior surface 232 is above the bottom wall interior surface 242 relative to the direction of gravity. The posts 170 each include a post height 220 defined as the height between the bottom wall interior surface 242 and the top end face 236 of the post 170.

Figure 14:
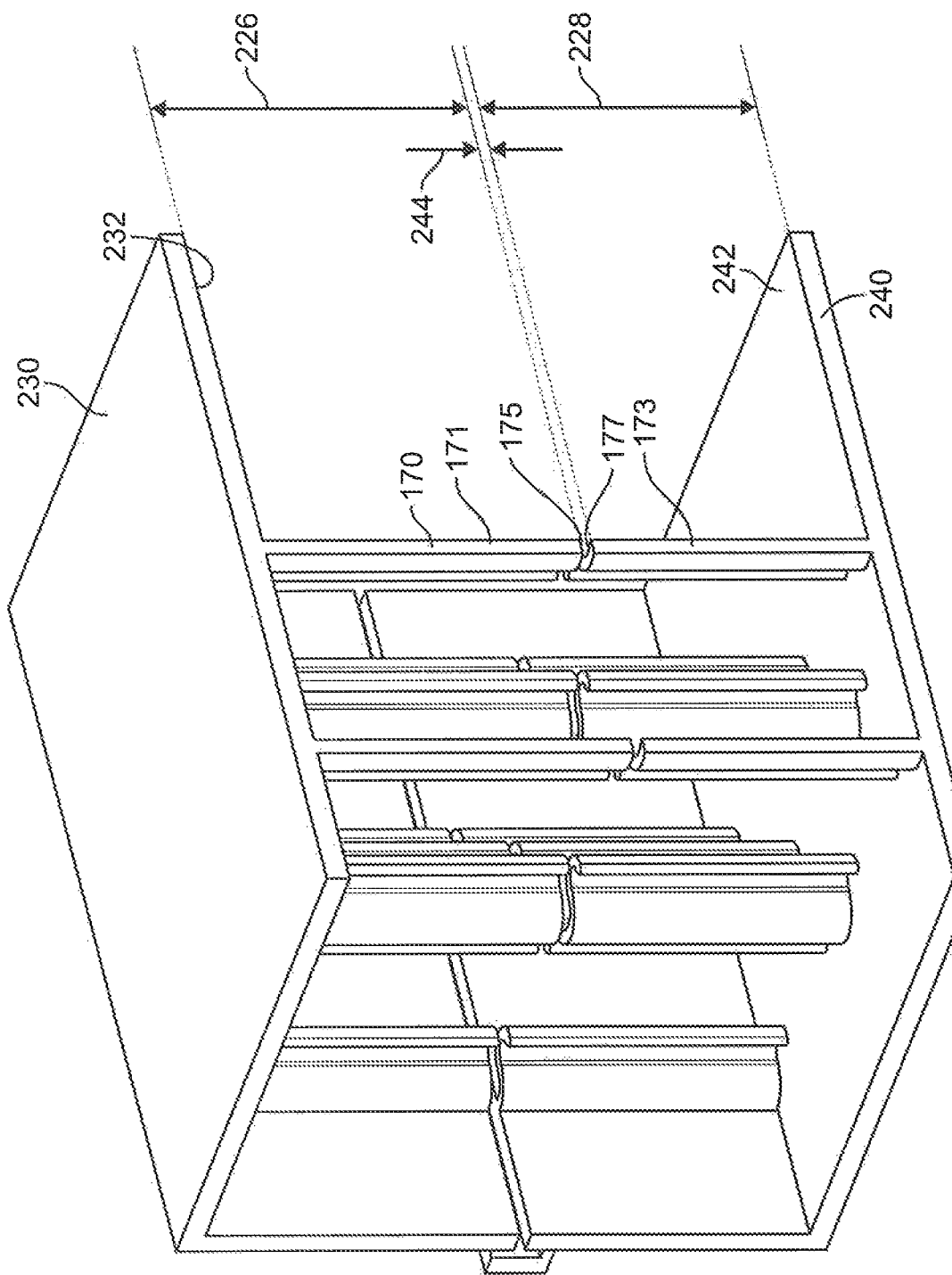
FIG. 14 shows a perspective view of a post arrangement of the pre-separator of FIG. 2, according to still another example embodiment.

Referring to FIG. 14, a fourth post arrangement is shown, according to an example embodiment. The fourth post arrangement is shown in use with a pre-separator 120, but can also be used as part of a post-separator 140. The pre-separator 120 includes a top wall 230 having a top wall interior surface 232 and a bottom wall 240 including a bottom wall interior surface 242. The posts 170 each include a top post portion 171 and a bottom post portion 173. The top post portion 171 includes a top post bottom end face 175 and the bottom post portion 173 includes a bottom post top end face 177. The top post portion 171 extends from the top wall interior surface 232 to a top post bottom end face 175. The bottom post portion 173 extends from the bottom wall interior surface 242 to a bottom post top end face 177. The bottom post top end face 177 is spaced a distance from the top post bottom end face 175. A gap 244 exists between the top post bottom end face 175 and the bottom post top end face 177. The top post portion 171 includes a top post height 226, and the bottom post portion 173 includes a bottom post height 228. The top post height 226 is defined as the height between the top wall interior surface 232 and the top post bottom end face 175. The bottom post height 228 is defined as the height between the bottom wall interior surface 242 and the bottom post top end face 177.

It should be noted that any use of the term "example" herein to describe various embodiments is intended to indicate that such embodiments are possible examples, representations, and/or illustrations of possible embodiments (and such term is not intended to connote that such embodiments are necessarily extraordinary or superlative examples).

The terms "coupled" and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

It is important to note that the construction and arrangement of the various example embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Additionally, features from particular embodiments may be combined with features from other embodiments as would be understood by one of ordinary skill in the art. Other substitutions, modifications, changes and omissions may also be made in the design, operating conditions and arrangement of the various example embodiments without departing from the scope of the present invention.

Accordingly, the present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

What is claimed is:

1. An air/liquid separator system comprising:
    a pre-separator configured to separate liquid particles from an air/liquid mixture, the pre-separator comprising:
        a pre-separator inlet receiving the air/liquid mixture;
        a pre-separator air outlet discharging a pre-separated air/liquid mixture;
        a pre-separator liquid outlet discharging separated liquid;
        a plurality of posts disposed between the pre-separator inlet and the pre-separator air outlet, the plurality of posts arranged in a staggered array and each comprising:
            a convex end portion having an impaction surface contacting the air/liquid mixture, a portion of liquid particles from the air/liquid mixture adhering as a liquid film to the impaction surface; and
            a hook end portion positioned downstream the convex end portion and including one or more hooks having an end and a collection pocket disposed between the impaction surface and the end, the collection pocket collects the portion of liquid particles adhered as the liquid film to the impaction surface;
    a main separator comprising:
        an inlet receiving the pre-separated air/liquid mixture from the pre-separator;
        a main separator air outlet discharging a cleaned air/liquid mixture; and
        a main separator liquid outlet discharging separated liquid.

2. The separator system of claim 1, further comprising a post-separator configured to receive the cleaned air/liquid mixture from the main separator and further separate liquid particles prior to discharging a post-separated air/liquid mixture.

3. The separator system of claim 1, further comprising a line-of-sight baffle configured to receive the cleaned air/liquid mixture from the main separator and break a direct flow path of liquid particles in the cleaned air/liquid mixture prior to discharge.

4. The separator system of claim 1, further comprising a crankcase of an engine, the pre-separator inlet receiving blowby gas from the crankcase, discharging a pre-separated blowby gas from the pre-separator air outlet to the main separator, and discharging a separated oil back to the crankcase.

5. The separator system of claim 1, wherein an inner diameter of each of the one or more hooks ranges from 1 mm to 2.5 mm.

6. The separator system of claim 1, wherein an outer diameter of each of the plurality of posts ranges from 3 mm to 5 mm.

7. The separator system of claim 1, wherein the pre-separator further comprises a top wall having a top wall interior surface and a bottom wall having a bottom wall interior surface, the plurality of posts each extending between the top wall interior surface and the bottom wall interior surface.

8. The separator system of claim 1, wherein the pre-separator further comprises a top wall having a top wall interior surface and a bottom wall having a bottom wall interior surface, the plurality of posts each comprising a bottom end face and extending between the top wall interior surface and the bottom end face;
wherein the bottom end face is spaced a distance from the bottom wall interior surface, defining a gap between the bottom end face and the bottom wall interior surface.

9. The separator system of claim 1, wherein the pre-separator further comprises a top wall having a top wall interior surface and a bottom wall having a bottom wall interior surface, the plurality of posts each comprising a top end face and extending between the bottom wall interior surface and the top end face;
wherein the top end face is spaced a distance from the top wall interior surface, defining a gap between the top end face and the top wall interior surface.

10. The separator system of claim 1, wherein the pre-separator further comprises a top wall having a top wall interior surface and a bottom wall having a bottom wall interior surface, the plurality of posts each comprising a top portion post and a bottom portion post;
wherein the top post portion comprises a bottom end face, the top post portion extending between the top wall interior surface and the bottom end face;
wherein the bottom post portion comprises a top end face, the bottom post portion extending between the bottom wall interior surface and the top end face; and
wherein the bottom post portion is spaced a distance from the top post portion, defining a gap between the bottom post portion and the top post portion.

11. An air/liquid pre-separator configured to separate liquid particles from an air/liquid mixture, the pre-separator comprising:
a pre-separator inlet receiving an air/liquid mixture;
a pre-separator air outlet discharging a pre-separated air/liquid mixture;
a pre-separator liquid outlet discharging separated liquid;
a plurality of posts disposed between the pre-separator inlet and the pre-separator air outlet, the plurality of posts arranged in a staggered array and each comprising:
a convex end portion having an impaction surface contacting the air/liquid mixture, a portion of liquid particles from the air/liquid mixture adhering as a liquid film to the impaction surface; and
a hook end portion positioned downstream the convex end portion and including one or more hooks having an end and a collection pocket disposed between the impaction surface and the end, the collection pocket collecting the portion of liquid particles adhered as the liquid film to the impaction surface.

12. The pre-separator of claim 11, wherein the pre-separator further comprises a top wall having a top wall interior surface and a bottom wall having a bottom wall interior surface, the plurality of posts each extending between the top wall interior surface and the bottom wall interior surface.

13. The pre-separator of claim 11, wherein the pre-separator further comprises a top wall having a top wall interior surface and a bottom wall having a bottom wall interior surface, the plurality of posts each comprising a bottom end face and extending between the top wall interior surface and the bottom end face;
wherein the bottom end face is spaced a distance from the bottom wall interior surface, defining a gap between the bottom end face and the bottom wall interior surface.

14. The pre-separator of claim 11, wherein the pre-separator further comprises a top wall having a top wall interior surface and a bottom wall having a bottom wall interior surface, the plurality of posts each comprising a top end face and extending between the bottom wall interior surface and the top end face;
wherein the top end face is spaced a distance from the top wall interior surface, defining a gap between the top end face and the top wall interior surface.

15. The pre-separator of claim 11, wherein the pre-separator further comprises a top wall having a top wall interior surface and a bottom wall having a bottom wall interior surface, the plurality of posts each comprising a top portion post and a bottom portion post;
wherein the top post portion comprises a bottom end face, the top post portion extending between the top wall interior surface and the bottom end face;
wherein the bottom post portion comprises a top end face, the bottom post portion extending between the bottom wall interior surface and the top end face;
wherein the bottom post portion is spaced a distance from the top post portion, defining a gap between the bottom post portion and the top post portion.

16. The pre-separator of claim 11, wherein an inner diameter of each of the one or more hooks ranges from 1 mm to 2.5 mm.

17. The pre-separator of claim 11, wherein an outer diameter of each of the plurality of posts ranges from 3 mm to 5 mm.

18. The pre-separator of claim 11, wherein a spacing factor defined as a lateral spacing divided by a post length ranges from 0.8 to 1.2, and an overlap factor, defined as an overlap distance divided by a post width, ranges from −0.2 to 0.25.

19. An air/liquid post-separator configured to separate liquid particles from an air/liquid mixture received from a main separator, the post-separator comprising:
a post-separator inlet receiving a pre-cleaned air/liquid mixture;
a post-separator air outlet discharging a post-separated air/liquid mixture;
a post-separator liquid outlet discharging separated liquid;
a plurality of posts disposed between the post-separator inlet and the post-separator air outlet, the plurality of posts arranged in a staggered array and each comprising:
a convex end portion having an impaction surface contacting the pre-cleaned air/liquid mixture, a portion of liquid particles from the pre-cleaned air/liquid mixture adhering as a liquid film to the impaction surface; and a hook end portion positioned downstream the convex end portion and including one or more hooks having an end and a collection pocket disposed between the impaction surface and the end, the collection pocket collecting the portion of liquid particles adhered as the liquid film to the impaction surface.

20. A line-of-sight baffle configured to separate liquid particles from an air/liquid mixture received from a main separator, the line-of-sight baffle comprising:

a baffle inlet receiving an air/liquid mixture;

a baffle air outlet discharging pre-separated air/liquid mixture;

a baffle liquid outlet discharging separated liquid;

a plurality of posts disposed between the baffle inlet and the baffle air outlet, the plurality of posts arranged in a staggered array and each comprising:

a convex end portion having an impaction surface contacting the air/liquid mixture, a portion of liquid particles from the air/liquid mixture adhering as a liquid film to the impaction surface; and a hook end portion positioned downstream the convex end portion and including one or more hooks having an end and a collection pocket disposed between the impaction surface and the end, the collection pocket collecting the portion of liquid particles adhered as the liquid film to the impaction surface.

\* \* \* \* \*